(12) United States Patent
Moens et al.

(10) Patent No.: US 7,695,773 B2
(45) Date of Patent: Apr. 13, 2010

(54) RADIATION CURABLE POWDER COATING COMPOSITIONS

(75) Inventors: Luc Moens, Sint-Genesius-Rode (BE); Nele Knoops, Herent (BE); Daniel Maetens, Brussels (BE)

(73) Assignee: CYTEC Surface Specialties, S.A., Bruxelles (BE)

( * ) Notice: Subject to any disclaimer, the term of this patent is extended or adjusted under 35 U.S.C. 154(b) by 176 days.

(21) Appl. No.: 11/663,585

(22) PCT Filed: Sep. 23, 2005

(86) PCT No.: PCT/EP2005/010344

§ 371 (c)(1),
(2), (4) Date: Apr. 3, 2007

(87) PCT Pub. No.: WO2006/037493

PCT Pub. Date: Apr. 13, 2006

(65) Prior Publication Data

US 2008/0206480 A1  Aug. 28, 2008

(30) Foreign Application Priority Data

Oct. 6, 2004  (EP) ................... 04023751

(51) Int. Cl.
*B05D 3/06* (2006.01)
(52) U.S. Cl. .................. 427/493; 427/496; 427/500; 427/506; 427/507; 427/508; 427/514; 427/517; 427/518; 427/519; 427/520; 427/521; 427/522; 427/551; 427/553; 427/557; 427/558; 427/559; 427/180; 427/189; 427/195; 427/201

(58) Field of Classification Search ................. None
See application file for complete search history.

(56) References Cited

U.S. PATENT DOCUMENTS

| | | | | |
|---|---|---|---|---|
| 4,000,349 A | * | 12/1976 | Dickie et al. ............... 428/461 |
| 6,005,017 A | * | 12/1999 | Daly et al. ................... 522/20 |
| 6,376,584 B1 | | 4/2002 | Galbo et al. | |
| 6,380,279 B1 | * | 4/2002 | Moens et al. ............... 522/111 |
| 6,384,102 B1 | * | 5/2002 | Moens et al. ............... 522/110 |
| 6,710,137 B2 | * | 3/2004 | Matsumoto et al. .... 525/440.02 |
| 6,727,325 B1 | * | 4/2004 | Suzuki et al. ............... 525/523 |
| 6,777,027 B2 | * | 8/2004 | Daly et al. .................. 427/180 |
| 6,995,194 B2 | * | 2/2006 | Moens et al. ............... 522/111 |
| 2003/0150359 A1 | * | 8/2003 | Lassmann ................... 106/499 |
| 2004/0132902 A1 | * | 7/2004 | Bremser et al. ............ 524/800 |
| 2004/0198862 A1 | * | 10/2004 | Moens et al. ............... 522/114 |

FOREIGN PATENT DOCUMENTS

| EP | 197616 | * 10/1986 |
|---|---|---|
| WO | 03/008508 | 1/2003 |

* cited by examiner

*Primary Examiner*—Erma Cameron
(74) *Attorney, Agent, or Firm*—Wenderoth, Lind & Ponack, L.L.P.

(57) ABSTRACT

The present invention relates to powder compositions curable by ultraviolet irradiation or by accelerated electron beams. These powder compositions comprise at least one ethylenically unsaturated resin, and lend to the production of paint and varnish coatings exhibiting a unique combination of properties, inter alia good flow and mechanical properties and above all outstanding adhesion to metal substrates, persisting on ageing.

24 Claims, No Drawings

RADIATION CURABLE POWDER COATING COMPOSITIONS

The present invention concerns radiation curable powder compositions comprising at least one ethylenically unsaturated resin, as well as the preparation and the uses of said compositions.

More particularly, the present invention relates to powder compositions curable by ultraviolet irradiation or by accelerated electron beams, the binder of which is composed of at least one ethylenically unsaturated resin, which lend themselves to the production of paint and varnish coatings exhibiting a unique combination of properties, inter alia good flow and mechanical properties and above all outstanding adhesion to metal substrates, persisting on ageing.

Powder coatings, which are dry, finely derived, free flowing solid materials at room temperature, have gained considerable popularity in recent years over liquid coatings.

Today's commercial radiation curable powder coatings applied on wood or plastic substrates generally provide satisfactory results; however when used on metal substrates, one of the major problems experienced with radiation curable powder coatings is the poor adhesion of the cured film to the metal surface. It has been postulated that the reason for the poor adhesion properties of such coatings is often the rapid and quick curing of the polymeric material accompanied with some film shrinkage.

The introduction of metal adhesion promoters in coating systems has already been disclosed in patent literature.

WO 03/008508 (UCB S.A.) discloses radiation curable powder compositions comprising an ethylenically unsaturated resin and a phosphorous containing compound providing good adhesion on metal substrates.

However, it was noted that upon ageing of the compositions, some important properties such as good adhesion and flexibility can be lost.

It is accordingly the object of the present invention to provide a powder coating composition, capable of being cured by radiation upon melting, which provides a paint film proving an outstanding long-term adhesion to metal along with an excellent combination of physical properties such as smoothness and flexibility.

It now has been surprisingly found that radiation curable powder coating compositions comprising at least one ethylenically unsaturated resin, at least one phosphorous containing compound and at least one amine exhibit upon melting and curing an excellent combination of physical properties such as smoothness, flexibility and above all an outstanding adhesion to metal substrates which persists upon ageing of the resin, the powder and the cured coating, even without an extensive metal surface preparation.

The present invention therefore provides a radiation curable powder composition which comprises, per 100 parts by weight of (a), (b) and (c), (a) 70 to 99.4 parts by weight of at least one ethylenically unsaturated resin,
(b) 0.5 to 20 parts by weight of at least one phosphorous containing compound, and
(c) 0.1 to 10 parts by weight of at least one amine.

The ethylenically unsaturated resin (a) of the powder composition of the present invention is preferably selected from:
(a1) ethylenically unsaturated group containing polyester resins (more particularly amorphous or semi-crystalline polyester resins)
(a2) acrylic copolymers having ethylenically unsaturated groups
(a3) ethylenically unsaturated group containing polyphenoxy resins
(a4) ethylenically unsaturated group containing non-aromatic epoxy resins
(a5) ethylenically unsaturated group containing polyurethanes
(a6) ethylenically unsaturated group containing polyesteramides, used alone or as a mixture.

The powder composition of the present invention preferably comprises 90 to 99 parts by weight of the ethylenically unsaturated resin (a) per 100 parts of the total weight of resin (a), phosphorous containing compound (b) and amine (c).

The ethylenically unsaturated group containing polyesters (a1) useable in the powder composition of the present invention are preferably obtained from hydroxyl and/or carboxylic acid group terminated polyesters prepared from:

an acid constituent which contains from 50 to 100% mole of terephthalic acid, isophthalic acid, 1,4-cyclohexanedicarboxylic acid or a straight chain aliphatic diacid having 2 to 12 carbon atoms and from 0 to 50% mole of another saturated and/or unsaturated polyacid constituent selected from fumaric acid, maleic acid, itaconic acid, phthalic acid, isophthalic acid, terephthalic acid, 1,2-cyclohexanedicarboxylic acid, 1,3-cyclohexanedicarboxylic acid, 1,4-cyclohexanedicarboxylic acid, succinic acid, glutaric acid, adipic acid, pimelic acid, suberic acid, azelaic acid, sebacic acid, 1,12-dodecanedioic acid, trimellitic acid, pyromellitic acid and their anhydrides, alone or as a mixture a glycol constituent which contains from 20 to 100% mole of neopentyl glycol, if the acid constituent contains at least 50% mole of terephthalic or isophthalic acid, or from 20 to 100% mole of a cycloaliphatic diol selected from 1,4-cyclohexanediol, 1,4-cyclohexanedimethanol, hydrogenated Bisphenol A, 2,2,4,4-tetramethyl-1,3-cyclobutanediol, 4,8-bis(hydroxymethyl)-tricyclo-[5,2,1, $0^{2,6}$]-decane, if the acid constituent contains at least 50% mole of 1,4-cyclohexanedicarboxylic acid or a straight chain aliphatic diacid having 2 to 12 carbon atoms, or from 20 to 100% mole of a saturated, straight chain aliphatic diol having 2 to 12 carbon atoms selected from ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, if the acid constituent contains at least 50% mole of 1,4-cyclohexanedicarboxylic acid, terephthalic acid or a straight chain aliphatic diacid having 2 to 12 carbon atoms, and from 0 to 80% mole of another polyol.

These polyesters are generally characterised with an acid number (AN) and/or an hydroxyl number (OHN) ranging from 10 to 100 mg KOH/g and particularly from 25 to 75 mg KOH/g, a number average molecular weight (Mn) from 800 to 14000 and particularly from 1000 to 8000, a glass transition temperature (Tg) from 40 to 85° C. when the polyester is amorphous, or a melting temperature from 60 to 150° C. and a glass transition temperature of less than 50° C. when the polyester is semi-crystalline, a degree of unsaturation ranging from 0 to 4.0 and preferably from 0 to 2.5 milliequivalents of double bonds per gram of polyester and a Brookfield cone/plate viscosity of less than 50 000 mPa·s measured at 200° C.

The hydroxyl or carboxyl functional polyesters further can be converted into (meth)acryloyl group end-capped polyesters from the reaction of a diisocyanate with a hydroxyalkyl (meth)acrylate and the terminal hydroxyl groups of the polyester or from the reaction of a compound having an ethylenically unsaturated group and an epoxy functional group and the terminal carboxyl groups of the polyester.

The hydroxyalkyl(meth)acrylate used for reaction with the di-isocyanate in the above reaction is preferably selected from hydroxyethyl(meth)acrylate, 2- or 3-hydroxypropyl (meth)acrylate, 2-, 3- and 4-hydroxybutyl(meth)acrylate, etc.

The di-isocyanate used for the reaction with the hydroxyalkyl(meth)acrylate and the hydroxyl group containing polyester in the above reaction is preferably selected from 1-isocyanato-3,3,5-trimethyl-5-isocyanatomethyl-cyclohexane (isophoronediisocyanate, IPDI), tetramethyl-xylenediisocyanate (TMXDI), hexamethylenediisocyanate (HDI), trimethylhexamethylenedi-isocyanate, 4,4'-diisocyanatodicyclohexylmethane, 4,4'-di-isocyanatodiphenylmethane, these technical mixtures with 2,4-diisocyanatodiphenylmethane and also the higher homologues of above mentioned diisocyanates, 2,4-diisocyanatotoluene and technical mixtures of them with 2,6-diisocyanatotoluene, as well as the copolymerisation product of α,α'-dimethyl-meta-isopropenylbenzylisocyanate (TMI).

According to the present invention, the compound having an ethylenically unsaturated group and an epoxy functional group is preferably selected from glycidyl acrylate, glycidyl methacrylate, methyl glycidyl methacrylate, methyl glycidyl acrylate, 3,4-epoxycyclohexylmethyl(meth)acrylate, 1,2-ethyleneglycolglycidylether(meth)acrylate, 1,3-propyleneglycolglycidylether(meth)acrylate, 1,4-butyleneglycolether(meth)acrylate, 1,6-hexanediolether(meth)acrylate, 1,3-(2-ethyl-2-butyl)-propanediolglycidylether(meth)acrylate and acrylic glycidyl ether.

The ethylenically unsaturated group containing polyesters (a1) usable in the compositions according to the invention preferably exhibit following characteristics:
- a number average molecular weight (Mn) from 1100 to 16000, more preferably between 1300 and 8500 measured by gel permeation chromatography (GPC)
- a degree of unsaturation from 0.17 to 4.00, particularly of 0.35 to 2.50, milliequivalents of double bonds per gram of polyester The polyesters (a1) further preferably exhibit:
- a Brookfield cone/plate melt viscosity of less than 50 000 mPa·s at 200° C. and most preferably of less than 10 000 mPa·s at 175° C. when the polyester is semi-crystalline, measured according to ASTM D4287
- a glass transition temperature (Tg) from 35 to 80° C. when the polyester is amorphous, or a melting temperature from 60 to 150° C. and a glass transition temperature of less than 50° C. when the polyester is semi-crystalline, as determined by differential scanning calorimetry (DSC) according to ASTM D3418

The ethylenically unsaturated group containing polyester (a1) usable in the compositions of the present invention is more preferably an ethylenically unsaturated group containing polyester (a1) which is amorphous or its mixture with an ethylenically unsaturated group containing polyester (a1) which is semi-crystalline.

The ethylenically unsaturated group containing acrylic copolymers (a2) usable in the powder composition of the present invention are generally prepared from the reaction of ethylenically unsaturated compounds having functional groups with an acrylic copolymer having functional groups being capable of reacting with the functional groups of the ethylenically unsaturated compounds.

The acrylic copolymer having reactable functional groups is preferably obtained from 40 to 95% mole of at least one acrylic or methacrylic monomer, from 0 to 60% mole of at least one other ethylenically unsaturated monomer and from 5 to 60% mole of an ethylenically unsaturated monomer having functional groups selected from epoxy, carboxyl, hydroxyl or isocyanate groups.

The ethylenically unsaturated group containing acrylic copolymer (a2) usable in the powder composition of the present invention is generally prepared accordingly a two step process.

In a first step an acrylate copolymer is prepared in a polymerisation process, in which a certain portion of functional monomer is copolymerised to obtain a functionalised acrylate copolymer. This functional monomer, which is usually present in amounts of between 5 and 60% mole, is preferably an epoxy-functional monomer, for example on the basis of glycidyl(meth)acrylate. However, acid-functional monomers, for example on the basis of (meth)acrylic acid, hydroxyl-functional monomers, for example on the basis of hydroxyethyl(meth)acrylate, or isocyanate-functional monomers, for example on the basis of TMI (benzene, 1-(1-isocyanato-1-methylethyl)-4-(1-methylethenyl)) or MOI (2-isocyanatoethylmethacrylate) can be used.

The monomers are usually copolymerised in the presence of free-radical initiator such as benzoyl peroxide, tert.-butyl peroxide, decanoyl peroxide, azo-bis-isobutyronitrile, and the like, in an amount of from 0.1 to 5% by weight of the monomers. Useful monomers for the preparation of the acrylic copolymer are methyl(meth)acrylate, ethyl(meth)acrylate, propyl(meth)acrylate, n-butyl(meth)acrylate, isobutyl(meth)acrylate, tert.-butyl(meth)acrylate, 2-ethylhexyl(meth)acrylate, stearyl(meth)acrylate, tridecyl(meth)acrylate, cyclohexyl(meth)acrylate, benzyl (meth)acrylate, benzyl(meth)acrylate, phenyl(meth)acrylate, dimethylaminoethyl(meth) acrylate, diethylaminoethyl(meth)acrylate, polysiloxane (meth)acrylate and caprolactone (meth)acrylate.

Other copolymerisable monomers, which can be present in amounts between 0 and 60% mole, are for example styrene, α-methylstyrene, vinyltoluene, acrylonitrile, methacrylonitrile, vinyl acetate, vinyl propionate, acrylamide, methacrylamide, methylolmethacrylamide, vinylchloride, ethylene, propylene and C4-20 α-olefins.

In the second step an addition reaction is carried out between the functionalised acrylate copolymer obtained from the first step and the functionalised ethylenically unsaturated compound, generally a (meth)acrylate ester group containing compound, that can react with said functionalised acrylate copolymer through a functional group capable of reacting with carboxyl, epoxy, isocyanate or hydroxyl groups. The compound is more preferably (meth)acrylic acid, (β-methyl) glycidyl(meth)acrylate, MOI or hydroxyethyl(meth)acrylate.

The addition reaction of the second step can be done either in bulk or in solvent. Typical solvents are toluene, xylene, n-butylacetate, etc. The compound containing an unsaturated group that can react with the functionalised acrylate polymer is added at temperatures between 50 and 180° C. The mixture is stirred for several hours. The progress of the reaction is followed by titration.

The ethylenically unsaturated group containing acrylic copolymer (a2) usable in the powder composition of the present invention preferable exhibits following characteristics:
- a number average molecular weight (Mn) from 1000 to 20000 and more preferably between 2000 and 8000 measured by GPC
- a degree of unsaturation from 0.35 to 3.50, and more preferably from 0.5 to 2.5, milliequivalents of double bounds per gram of acrylic copolymer a Brookfield cone/plate melt viscosity of less than 50 000 mPa·s measured at 200° C. according to ASTM D4287 a glass transition temperature (Tg) from 45 to 100° C. as determined by DSC according to ASTM D3418

The ethylenically unsaturated group containing polyphenoxy resin (a3) usable in the powder composition of the present invention is generally obtained from the reaction of (meth)acrylic acid with a glycidyl group containing polyphenoxy resin such as Bisphenol A based epoxy resins or the phenol or cresol epoxy novolacs.

The Bisphenol A based epoxy resins can be prepared from the reaction of Bisphenol A and epichlorohydrin, wherein the excess of epichlorohydrin determines the number average molecular weight of the epoxy resin (W. G. Potter: Epoxide Resins, Springer-Verlag, New York 1970; Y. Tanaka et al. (eds.): Epoxy Resins Chemistry and Technology, Marcel Dekker, New York 1973, Chapter 2, pp. 9-134). The phenol and cresol epoxy novolacs can be prepared by the acid-catalysed condensation of formaldehyde with either phenol or cresol. Epoxidation of the novolacs with epichlorohydrin furnishes the epoxy novolacs. Commercially available epoxy resins, such as Epikote 1055 from Shell, Araldite GT7004 or Araldite ECN9699 from Ciba, D.E.R.664 from Dow, etc., are typical examples of glycidyl group containing polyphenoxy resins that can be utilised for the preparation of the ethylenically unsaturated group containing polyphenoxy resin (a3).

The ethylenically unsaturated group containing polyphenoxy resins (a3) which may be incorporated in the compositions in accordance with the present invention, preferably exhibit a degree of unsaturation of 0.2 to 6.0, particularly of 0.5 to 4.5, milliequivalents of double bonds per gram of resin, and in a specifically preferred embodiment additionally exhibit the following characteristics:

a number average molecular weight (Mn) from 500 to 5000, preferably between 650 and 3500, measured by gel permeation chromatography (GPC)

a glass transition temperature (Tg) determined by differential scanning calorimetry (DSC) according to ASTM D3418, from 30 to 80° C.

a Brookfield cone/plate viscosity in the molten state measured at 200° C. according to ASTM D4287, of less than 25 000 mPa·s.

The ethylenically unsaturated group containing non-aromatic epoxy resin (a.4) usable in the powder composition of the present invention is generally obtainable from the reaction of (meth)acrylic acid with a glycidyl group containing aliphatic resin such as the hydrogenated Bisphenol A based epoxy resins.

The ethylenically unsaturated group containing non-aromatic epoxy resins (a.4) usable in the powder composition of the present invention preferably exhibit following characteristics:

a number average molecular weight (Mn) from 450 to 5000, more preferably between 1000 and 3500, measured by gel permeation chromatography (GPC)

a degree of unsaturation from 0.4 to 4.5, and more preferably from 0.5 to 2.5, milliequivalents of double bounds per gram of aliphatic unsaturated resin a glass transition temperature (Tg) determined by differential scanning calorimetry (DSC) according to ASTM D3418, from 30 to 80° C.

a Brookfield cone/plate viscosity in the molten state measured at 200° C. according to ASTM D4287, of less than 20000 mPa·s.

The ethylenically unsaturated group containing polyurethanes (a5) usable in the compositions according to the present invention are generally prepared from the reaction of a hydroxyalkyl(meth)acrylate and a polyol with a polyisocyanate.

Polyols which are preferably used for the preparation of the (meth)acryloyl group containing polyurethanes are chosen among the C2-C15 aliphatic or cycloaliphatic diols, polyester polyols or polyether polyols.

Examples of C2-C15 aliphatic or cycloaliphatic diols are ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-methyl-1,3-propanediol, hydroxypivalate ester of neopentyl glycol, 1,4-cyclohexanediol, 1,4-cyclohexanedimethanol, hydrogenated Bisphenol A, 2,2,4,4-tetramethyl-1,3-cyclobutanediol, 4,8-bis(hydroxymethyl)-tricyclo-$[5,2,1,0^{2,6}]$-decane.

The polyester polyols, which are preferably characterised by number average molecular weight (Mn) from 8200 to 4000, are generally prepared from a stoichiometric excess of an aliphatic or cycloaliphatic polyol with an aromatic, aliphatic or cycloaliphatic polyacid, the polyacids and the polyols being selected among those recited earlier for the preparation of the (meth)acryloyl group containing polyesters.

Examples of the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed in Encyclopaedia Technology, Vol. 7, pp. 257-262, published by Interscience Publishers, Inc. (1951).

Examples of polyisocyanates that can be used for the preparation of the ethylenically unsaturated group containing polyurethanes of the present invention are 1-isocyanato-3,3,5-trimethyl-5-isocyanatomethylcyclohexane (isophoronediisocyanate, IPDI), tetramethylxylenediisocyanate (TMXDI), hexamethylenediisocyanate (HDI), trimethylhexamethylenediisocyanate, 4,4'-diisocyanatodicyclohexylmethane, 4,4'-diisocyanatodiphenylmethane, these technical mixtures with 2,4-di-isocyanatodiphenylmethane and also the higher homologues of above mentioned diisocyanates, 2,4-di-isocyanatotoluene and technical mixtures of them with 2,6-diisocyanatotoluene, as well as the copolymerisation product of □,□'-dimethyl-meta-isopropenylbenzylisocyanate (TMI).

The hydroxyalkyl(meth)acrylates preferably used for the preparation of the ethylenically unsaturated group containing polyurethanes are hydroxyalkylesters of acrylic or methacrylic acid, more preferably having 2 to 4 carbon atoms in the hydroxyalkyl group such as hydroxyethyl(meth)acrylate, 2- and 3-hydroxypropyl(meth)acrylate and 2-, 3- and 4-hydroxybutyl(meth)acrylate.

The ethylenically unsaturated group containing polyurethanes (a5) usable in the compositions according to the present invention are preferably characterised by a number average molecular weight (Mn) from 800 to 15 000 and more preferably from 1 300 to 8500, a glass transition temperature (Tg) from 40 to 100° C., a degree of unsaturation ranging from 0.15 to 2.00, and more preferably from 0.35 to 1.50, milliequivalents of double bonds per gram of polyurethane Brookfield cone/plate viscosity of less than 100 000 mPa·s measured at 200° C.

The ethylenically unsaturated group containing polyesteramides (a6) usable in the compositions according to the present invention are generally prepared from the reaction of a compound having an ethylenically unsaturated group and an epoxy functional group with a carboxyl group terminated polyesteramide, said polyesteramide being prepared from the reaction of a carboxyl group terminated polyester with a diamine.

The carboxyl group terminated polyesters usable for the synthesis of the polyesteramides are generally prepared from aliphatic, cycloaliphatic or aromatic polyacids used in a mixture or alone, and aliphatic or cycloaliphatic polyols used in a mixture or alone, both, the polyacids and the polyols being selected among these examples as recited earlier for the preparation of the (meth)acryloyl group containing polyesters.

According to the present invention, the compound having an ethylenically unsaturated group and an epoxy functional group is preferably selected from glycidyl acrylate, glycidyl methacrylate, methyl glycidyl methacrylate, methyl glycidyl acrylate, 3,4-epoxycyclohexylmethyl(meth)acrylate, 1,2-ethyleneglycolglycidylether(meth)acrylate, 1,3-propyleneglycolglycidylether(meth)acrylate, 1,4-butyleneglycolether (meth)acrylate, 1,6-hexanediolether(meth)acrylate, 1,3-(2-ethyl-2-butyl)-propanediolglycidyl-ether(meth)acrylate and acrylic glycidyl ether.

Examples of the diamines which can be used, either alone or in combination, for the preparation of the polyesteramides are selected from ethylenediamine, 1,3-propanediamine, 1,5-pentanediamine, 1,6-hexanediamine, 1,2-cyclohexanediamine, 1,3-cyclohexanediamine, 1,4-cyclohexanediamine, 2,2-dimethyl-1,3-propanediamine, N-(2-aminoethyl)-1,2-ethanediamine, 3,3'-dimethyl-4,4'-diaminodicyclohexylmethane, 4,4'-diaminodicyclohexylmethane, 3,3'-dimethyl-4,4'-diaminodiphenylmethane, 4,4'-diaminodiphenylmethane and analogous compounds.

The polyesteramides usable for the preparation of the ethylenically unsaturated group containing polyesteramides are generally prepared accordingly a two or more step procedure process as claimed in U.S. Pat. No. 5,306,786.

On completion of the synthesis of the carboxylic acid group containing polyesteramide, a substantially equivalent amount of a monomer, having an ethylenically unsaturated group and an epoxy functional group is preferably added thereto, accordingly a procedure as described above for the preparation of the ethylenically unsaturated group containing polyesters starting from the carboxylic acid group functional polyester, to end up with a (meth)acryloyl group containing polyesteramide.

The ethylenically unsaturated group containing polyesteramides (a6) are more preferably characterised by:
a number average molecular weight (Mn) from 800 to 16 000 and preferably from 1300 to 8500,
a glass transition temperature (Tg) from 40 to 70° C. when the polyester is amorphous,
a degree of unsaturation ranging from 0.15 to 2.00, and preferably from 0.35 to 1.50, milliequivalents of double bonds per gram of polyester
a Brookfield cone/plate viscosity of less than 50000 mPa·s measured at 200° C.

The ethylenically unsaturated resins (a1), (a2), (a3), (a4), (a5) and (a6) usable in the powder composition of the present invention are used alone or in a mixture comprising one or more resins (a) of one type or a combination of two or more types (a1), (a2), (a3), (a4), (a5) or (a6). The composition of the present invention more preferably comprises at least one ethylenically unsaturated group containing polyester (a1) or a mixture of at least one ethylenically unsaturated group containing polyester (a1) with at least one ethylenically unsaturated group containing polyphenoxy resin (a3) or/and with at least one ethylenically unsaturated group containing acrylic copolymer (a2).

The powder composition of the present invention preferably comprises 0.9 to 10 parts by weight, more preferably 0.9 to 7 parts by weight, of phosphorous containing compound (b) per 100 parts by weight of resin (a), phosphorous containing compound (b) and amine (c).

The phosphorous containing compound (b) usable in the powder composition of the present invention is preferably selected from the group consisting of phosphoric acid and organic derivatives of phosphinic acid, phosphonic acid or phosphoric acid, said organic derivatives having at least one organic moiety characterised by the presence of at least one functional group, preferably terminally located. Such organic derivatives can be saturated or unsaturated, and preferably have at least one unit of olefinic unsaturation.

More particularly, the phosphorus containing compound has a formula (VI)

wherein
each $R^2$ is independently chosen from alkyl, aryl and alkenyl, each optionally containing 1 to 3 ether bridges, 1 to 3 —CO— bridges, and/or 1 to 3 —COO— bridges, and each optionally substituted by 1 to 10 halogen, hydroxyl and/or amino derivative;
each $R^3$ is independently hydrogen or $R^4$ wherein $R^4$ is as defined for $R^2$; and
n is 0 to 3.

The term "alkyl", as used herein, is defined as including saturated, monovalent hydrocarbon radicals having straight, branched or cyclic moieties or combinations thereof and containing 1 to 50 carbon atoms.

The term "alkenyl" as used herein, is defined as including straight and cyclic, branched and unbranched, unsaturated hydrocarbon radicals having at least one double bond and containing from 2 to 50 carbon atoms; such as ethenyl (=vinyl), 1-methyl-1-ethenyl, 2-methyl-1-propenyl, 1-propenyl, 2-propenyl (=allyl), 1-butenyl, 2-butenyl, 3-butenyl, 4-pentenyl, 1-methyl-4-pentenyl, 3-methyl-1-pentenyl, 1-hexenyl, 2-hexenyl, and the like.

The term "aryl" as used herein, is defined as including an organic radical derived from an aromatic hydrocarbon comprising 1 or more rings by removal of one hydrogen, and containing from 5 to 30 carbon atoms, such as phenyl and naphthyl.

The term "alkylene" as used herein, is defined as including saturated, divalent hydrocarbon radicals having straight, branched or cyclic moieties or combinations thereof and containing 1 to 50 carbon atoms.

The term "alkenylene" as used herein, is defined as including unsaturated, divalent hydrocarbon radicals having straight, branched or cyclic moieties or combinations thereof, containing at least one carbon-carbon double bond and containing 2 to 50 carbon atoms.

The term "arylene" as used herein, is defined as including divalent radicals derived from an aromatic hydrocarbon comprising one or more rings by removal of two hydrogen atoms and containing from 5 to 30 carbon atoms.

The term "aralkylene" as used herein, represents a divalent radical comprising a combination of alkylene and arylene moieties.

The term "heterocycle" as used herein is defined as including an aromatic or a non-aromatic cyclic alkyl or alkenyl moiety having at least one O, S and/or N atom interrupting the carbocyclic ring structure and optionally, one of the carbon of the carbocyclic ring structure may be replaced by a carbonyl.

The term "amino derivative", as used herein, represents a group of formula —NH$_2$, wherein one or both of the hydrogens may be replaced by alkyl, alkenyl, alkynyl, aryl or heterocycle.

By alkyl, alkenyl, alkylene, alkenylene, arylene and aralkylene containing an ether bridge is meant an alkyl, alkenyl, alkylene, alkenylene, arylene or aralkylene radical wherein a carbon atom is replaced by an oxygen atom, forming a group such as —C—O—C—.

By alkyl, alkenyl, aryl, heterocycle or a combination thereof containing an amino bridge is meant such radical wherein a tertiary or secondary amine group is present between two carbon atoms, forming a group of formula —C—NR$^x$—C—, wherein R$^x$ represents hydrogen, an alkyl or aryl group.

By alkylene, alkenylene, arylene and aralkylene containing a —COO— bridge is meant an alkylene, alkenylene, arylene or aralkylene radical wherein a

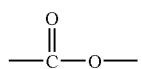

group is present between 2 carbon atoms, forming a group of formula

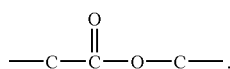

By alkylene, alkenylene, arylene and aralkylene containing a —CO— bridge is meant an alkylene, alkenylene, arylene or aralkylene radical wherein a

group is present between 2 carbon atoms, forming a group of formula

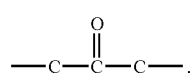

A particularly preferred group of the phosphorous containing compounds are those responding to formula (VII)

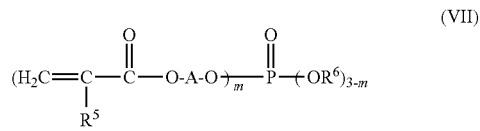

(VII)

wherein
each R$^5$ is independently hydrogen or an alkyl group having from 1 to 8 carbon atoms;
each R$^6$ is independently selected from the group consisting of hydrogen, an alkyl group having from 1 to 8 carbon atoms, and a haloalkyl group having from 1 to 8 carbon atoms;
each A is independently an alkylene group containing from 1 to 9 carbon atoms, optionally containing 1 to 3 ether bridges; and
m is 1 to 3.

Representative phosphorus containing compounds include, without limitation, 2-acryloyloxyethylphosphate, 2-methacryloyloxyethylphosphate, bis(2-acryloyloxyethyl)phosphate, bis(2-methacryloyloxyethyl)phosphate, tris(2-acryloyloxyethyl)phosphate, tris(2-methacryloyloxyethyl)phosphate, methyl-(2-acryloyloxyethyl)phosphate, methyl-(2-methacryloyloxyethyl)phosphate, ethyl-(2-acryloyloxyethyl)phosphate; ethyl-(2-methacryloyloxyethyl)phosphate, methyl-bis(2-acryloyloxyethyl)phosphate, methyl-bis(2-methacryloyloxyethyl)phosphate, ethyl-bis(2-acryloyloxyethyl)phosphate, ethyl-bis(2-methacryloyloxyethyl)phosphate, cyclohexene-3-phosphonic acid, α-hydroxybut-2-ene-phosphonic acid, vinyl phosphonic acid, divinyl phosphonic acid, allyl phosphonic acid, allyl-vinyl phosphonic acid, diallylphosphonic, 2-acryloyloxyethylphosphonic acid, 2-methacryloyloxyethylphosphonic acid, bis(2-acryloyloxyethyl)phosphonic acid, bis(2-methacryloyloxyethyl)phosphonic acid, allyl-(2-acryloyloxyethyl)phosphonic acid, allyl-(2-methacryloyloxyethyl)phosphonic acid, vinyl-(2-acryloyloxyethyl)phosphonic acid, vinyl-(2-methacryloyloxyethyl)phosphonic acid, allyl phosphinic acid, vinyl phosphinic acid, 2-acryloyloxyethylphosphinic acid, 2-methacryloyloxyethylphosphinic acid, and mixtures thereof.

The compositions according to the present invention more preferably comprise one or more compounds of formula (VII) wherein R$^5$ is hydrogen or methyl, R$^6$ is hydrogen and A is an alkylene comprising 2 to 6 carbon atoms, more preferably an ethylene, and m is 1, 2 or 3.

Particularly preferred are compositions comprising the reaction product of P$_2$O$_5$ with 2-hydroxyethyl(meth)acrylate.

The amine (c) usable in the composition according to the invention can be any organic compound comprising at least one group of formula

wherein each R' independently represents hydrogen, alkyl, alkenyl, aryl, heterocycle or a combination thereof, each optionally substituted by one or more hydroxyl and/or amino derivative, and optionally containing 1 to 3 ether bridges, 1 to 3 amino bridges, 1 to 3 —CO— bridges, and/or 1 to 3 —COO— bridges; wherein two R' moieties may be linked together in order to form a ring.

The amine (c) usable in the compositions according to the present invention is more preferably an amine of formula (I), (II), (III) or (IV), a polymer containing one or more groups of formula (V), or a mixture thereof

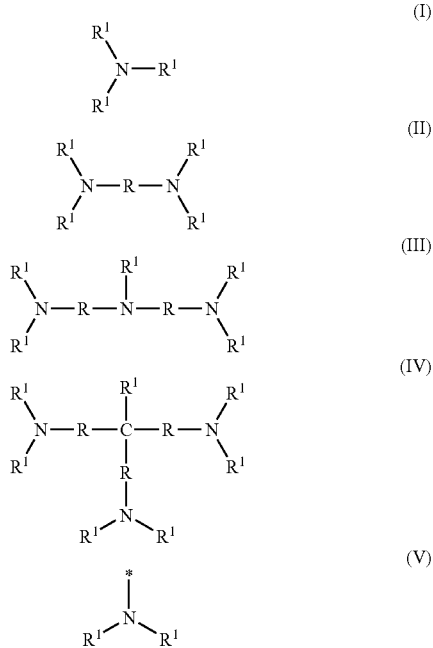

wherein each $R^1$ is independently chosen from hydrogen, alkyl, alkenyl, aryl, heterocycle or combinations thereof, each optionally substituted by one or more hydroxyl, and optionally containing 1 to 3 ether bridges, 1 to 3 —CO— bridges, and/or 1 to 3 —COO— bridges; wherein two $R^1$ moieties may be linked together in order to form a ring;

each R independently represents an alkylene, alkenylene, arylene or aralkylene chain which may contain from 1 to 3 ether bridges, 1 to 3 —CO— bridges and/or 1 to 3 —COO— bridges and which is optionally substituted by one or more hydroxyl;

with the proviso that the amine of formula (I) is not $NH_3$.

In polymers containing one or more groups of formula (V), the group(s) of formula (V) may be attached to the polymer directly or via a chain as defined for R.

The asterisk (*) indicates the point of attachment of the group of formula (V) to the polymer chain.

The amine c) usable in the compositions of the present invention preferably has a boiling point above 80° C., more preferably above 100° C.

In the amine c) according to the invention, $R^1$ is preferably a C1-6 alkyl; R is preferably a C1-12 alkylene. When the amine c) is a polymer containing one or more group(s) of formula (V), the polymer is preferably a poly(meth)acrylate.

The amine (c) usable in the powder composition of the present invention is more preferably selected from propylamine, butylamine, sec-butylamine, tert-butylamine, pentylamine, hexylamine, 2-ethylhexylamine, cyclohexylamine, octylamine, aniline, ethylenediamine, 1,2-diaminopropane, 1,3-diaminopropane, 2,2-dimethyl-1,3-propanediamine, 1,4-butanediamine, 1,5-pentanediamine, 1,6-hexanediamine, 1,2-cyclohexanediamine, 1,3-cyclohexanediamine, 1,4-cyclohexanediamine, 3-(methylamino)propylamine, 3-(dimethylamino)propylamine, 3-(ethylamino)propylamine, isophoronediamine, 4,4'-diaminodicyclohexylmethane 3,3'-dimethyl-4,4'-diaminodicyclohexylmethane, 4,4'-diaminodiphenylmethane, 3,3'-dimethyl-4,4'-diaminodiphenylmethane, 3-(diethylamino)propylamine, 3-methoxypropylamine, N-ethyl-1,2-dimethylpropylamine, iminobispropylamine, 3,3'-iminobis(N,N'-dimethylpropylamine), diethylamine, dipropylamine, dibutylamine, dihexylamine, di-(2-ethylhexyl)amine, triethylamine, tri-n-butylamine, tributylamine, trihexylamine, tri-(2-ethylhexyl) amine, tridecylamine, 3-amino-1-propanol, aminoethoxyethanol, aminoethanol, N,N-bis(3-aminopropyl)methylamine, 2-(diethylamino)ethylamine, diethylenetriamine, 2-methoxyethylamine, methylenedianiline, 4,7,10-trioxamidecane-1,13-diamine, N-(2-aminoethyl)-1,2-ethanediamine, di(2-methoxyethyl)amine, N,N'-bis(3-aminopropyl)ethylenediamine, N-(2-aminoethyl)-1,3-propylenediamine, N,N-diethylethanolamine, N,N-dimethylaminodiglycol, N,N-dimethylbutylamine, N,N-dimethylcyclohexylamine, N,N-dimethylethanolamine, dimethylethylamine, ditridecylamine, N-ethylcyclohexylamine, N-methylcyclohexylamine, methyldiethanolamine, N-monomethylethanolamine, N,N,N',N'',N''-pentamethyldiethylenetriamine, N,N,N',N'-tetramethyl-1,6-hexanediamine, N,N,N',N'-tetraethyl-1,6-hexanediamine, 1,8-diazabicyclo-5,4,0-undec-7-ene, 1,4-diazabicyclo-2,2,2-octane, 1,3,5-tris(dimethylaminopropyl)-hexahydrotriazine, 1,4-dimethylpiperazine, N,N'-dimethylpiperazine, 2,2'-dimorpholinodiethylether, morpholine, N-methylmorpholine, N-ethylmorpholine, cis-2,6-dimethylmorpholine, piperazine, N-methylpiperazine, N-ethylpiperazine, N-methylpiperidine, N-ethylpiperidine, hydroxyethylpiperidine, imidazole, 2,4,6-triamino-1,3,5-triazine, optionally substituted by one or more hydroxymethyl, methoxymethyl and/or butoxymethyl, and/or amine containing acrylic copolymers especially those incorporating e.g. 2-(tert-butylamino)ethyl methacrylate and/or 2-(diethylamino)ethyl methacrylate etc, used in a mixture or alone.

Most preferred amine usable in the compositions of the present invention is N,N,N',N'-tetramethyl-1,6-hexanediamine.

The compositions according to the present invention may optionally contain up to 20 parts by weight, and preferably up to 10 parts by weight, of an ethylenically unsaturated monomer or oligomer (d) per 100 parts of the total weight of (a), (b), (c) and (d).

The ethylenically unsaturated monomer or oligomer (d) usable in the composition of the present invention is preferably selected from the group consisting of compounds having a (meth)acrylate group, an allyl group or a vinyl group, the oligomer being derived from polyester, polyether, polycarbonate, polyurethane, acrylic copolymers, etc.

The ethylenically unsaturated monomer or oligomer (d) is more preferably selected from the triacrylate and the tri (meth)acrylate of tris(2-hydroxyethyl)isocyanurate, the epoxy acrylates and methacrylates which are formed by the reaction of an epoxy compound (for example, the diglycidyl ether of Bisphenol A with acrylic or methacrylic acid, the urethane acrylates and methacrylates which are formed by the reaction of an organic di- or polyisocyanate with an hydroxyalkylacrylate or a hydroxyalkylmethacrylate and optionally a mono- and/or polyhydroxylated alcohol (for example, the reaction product of hydroxyethyl(meth)acrylate with toluenediisocyanate or isophoronediisocyanate), the acrylic acrylates or methacrylates, such as, for example, the reaction product of (meth)acrylic acid with a copolymer containing glycidyl groups obtained by copolymerisation of acrylic monomers, such as n-butylmethacrylate and methylmethacrylate, and the like.

The amorphous and/or semi-crystalline polyesters (a1) and/or the acrylic copolymers (a2) and/or the polyphenoxy resins (a3) and/or non-aromatic epoxy resins (a4), and/or the polyurethane (a5) and/or the polyesteramide (a6) all containing ethylenically unsaturated groups, optionally along with the ethylenically unsaturated monomer or oligomer (d) and the phosphorous group containing compound (b) and the amine (c), all described above, are intended to be used as binders in the preparation of powder compositions curable by UV radiation or by accelerated electron beams, it being possible for the said compositions to be used in particular as varnishes and paints which e.g. lend themselves to application according to the technique of deposition by means of a triboelectric or electrostatic spray gun or according to the technique of deposition in a fluidised bed. The radiation curable powder compositions can be used as varnishes or paints as such or, if desired, the compositions can be used to prepare the varnishes or paints by adding, further constituents conventionally used in the preparation of powder varnishes and paints.

Therefore, the present invention also relates to the powder varnish or paint obtained using these compositions.

Finally, the present invention also relates to a process for coating an article more particularly a metal article comprising the application to the said article of a radiation curable powder composition in accordance with the invention by deposition such as by spraying with a triboelectric or electrostatic spray gun or by deposition in a fluidised bed, followed by the melting of the coating thus obtained such as by heating at a temperature of 80 to 150° C. for a time of e.g. approximately 0.5 to 10 minutes and by the curing of the coating in the molten state by UV irradiation or by accelerated electron beams.

For the radiation curing of the powder compositions in accordance with the invention with accelerated electron beams, it is not necessary to use a photo-initiator, seeing that this type of radiation provides by itself alone a production of free radicals which is sufficiently high for the curing to be extremely rapid. In contrast, when it concerns the photo-curing of the powder composition according to the invention with radiation where the wavelengths are between 200 and 600 nm (UV radiation), the presence of at least one photo-initiator is essential.

The photo-initiators which can be used according to the present invention are chosen from those commonly used for this purpose.

The appropriate photo-initiators which can be used, are aromatic carbonyl compounds, such as benzophenone and its alkylated or halogenated derivatives, anthraquinone and its derivatives, thioxanthone and its derivatives, benzoin ethers, aromatic or non-aromatic alphadiones, benzil dialkyl acetals, acetophenone derivatives and phosphine oxides.

Photo-initiators which may be suitable, are, for example, 2,2'-diethoxylacetophenone, 2-, 3- or 4-bromoacetophenone, 2,3-pentanedione, hydroxycyclohexylphenylketone, benzaldehyde, benzoin, benzophenone, 9,10-dibromoanthracene, 2-hydroxy-2-methyl-1-phenylpropan-1-one, 4,4'-dichlorobenzophenone, xanthone, thioxanthone, benzyldimethylketal, diphenyl (2,4,6-trimethylbenzyl)phosphine oxide, 4-(2-hydroxyethoxy)phenyl-(2-hydroxy-2-propyl)ketone (Irgacure 2959), bis(2,4,6-trimethylbenzoyl)-phenylphosphineoxide (Irgacure 819) and the like.

It may be optionally advantageous to use a photo-activator, such as tributylamine, 2-(2-aminoethylamino)ethanol, cyclohexylamine, diphenylamine, tribenzylamine or aminoacrylates such as, for example, the addition product of a secondary amine, such as dimethylamine, diethylamine, diethanolamine, and the like, with a polyol polyacrylate, such as the diacrylate of trimethylolpropane, 1,6-hexanediol, and the like.

The powder compositions in accordance with the invention can contain 0 to 15, and preferably 0.5 to 8 parts, of photo-initiators per 100 parts of the total weight of (a), (b), (c) and (d).

The radiation curable powder compositions and powder varnishes or paints, respectively, in accordance with the invention can also contain various additives conventionally used in the manufacture of powder paints and varnishes, such as UV light absorbers (such as Tinuvin 900 (Ciba)), light stabilisers, such as those based on sterically hindered amines (for example Tinuvin 144 from Ciba), fluidity-regulating agents (such as Resiflow PV5 (Worlee), Modaflow (Monsanto), Acronal 4F (BASF) or Crylcoat 109 (UCB)), degassing agents such as benzoin and the like, coating properties modifying substances (such as polytetrafluoroethylene modified polyethylene waxes (e.g. Lanco Wax TF 1830 from Lubrizol), polyethylene waxes (e.g. Ceraflour 961 from BYK Cheme), polypropylene waxes (e.g. Lanco Wax PP1362 from Lubrizol), polyamide waxes (e.g. Orgasol 3202 D NAT from ELF Atochem), organosilicones (e.g. Modarez S304P from Protex), etc., or blends of them). These substances are optionally added from 0 to 10 parts per 100 parts of the total weight of (a), (b), (c) and (d).

A variety of pigments and fillers can also be added to the radiation curable powder compositions in accordance with the invention. Mention will be made, as examples of pigments and fillers, of metal oxides, such as titanium oxide, iron oxide, zinc oxide, and the like, metal hydroxides, metal powders, sulfides, sulphates, carbonates, silicates such as, for example, aluminium silicate, carbon black, talc, kaolins, barytes, iron blues, lead blues, organic reds, organic maroons, and the like.

The amount of pigments and/or fillers is usually less than 40 parts by weight per 100 parts of the total weight of (a), (b), (c) and (d).

The composition according to the invention preferably consists of at least one ethylenically unsaturated resin (a), at least one phosphorous containing compound (b), at least one amine (c), and per 100 parts of the total weight of (a), (b), (c) and (d), from 0 to 20 parts by weight of an ethylenically unsaturated oligomer or monomer (d), from 0 to 15 parts by weight of photo-initiators, from 0 to 10 parts by weight of additives selected from UV light absorbers, light stabilisers, fluidity-regulating agents, degassing agents and coating properties modifying substances, and/or from 0 to 40 parts by weight of pigments and/or fillers.

For the preparation of the radiation curable powder compositions of the present invention the amorphous and/or semi-crystalline polyester (a1) and/or the acrylic copolymer (a2) and/or polyphenoxy resin (a3) and/or the non-aromatic epoxy resin (a4) and/or the polyurethane (a5) and/or the polyesteramide (a6) all containing ethylenically unsaturated groups, and/or the ethylenically unsaturated oligomer (d), if present, the phosphorous containing compound (b) and the amine (c), optionally the photo-initiator, optionally the various additional substances conventionally used for the manufacturing of powder paints and varnishes, and optionally the coating properties modifying substances are dry mixed, for example in a tumbler mixer. The mixture is then homogenised at a temperature generally ranging from 60 to 150° C. in an extruder, for example in a Buss Ko-Kneter single screw extruder or a twin screw extruder of Werner-Pfleiderer, APV-Baker or Prism type. The extrudate is then allowed to cool, is ground and sieved in order to obtain a powder in which the size of the particles is preferably between 10 and 150 µM.

Alternatively, to the ethylenically unsaturated resin (a1) and/or (a2) and/or (a3) and/or (a4) and/or (a5) and/or (a6) once prepared and still in the molten stage can be added as a solid or in the liquid stage the other ethylenically unsaturated resin (a1) and/or (a2) and/or (a3) and/or (a4) and/or (a5) and/or (a6) and/or the ethylenically unsaturated monomer or oligomer (d), the phosphorous containing compound (b) and the amine (c), thus constituting the binder of the powder composition of the present invention. Otherwise the ethylenically unsaturated resin (a1) and/or (a2) and/or (a3) and/or (a4) and/or (a5) and/or (a6) once prepared and still in the molten stage can be used as a solvent for the preparation of the other ethylenically unsaturated resin (a1) and/or (a2) and/or (a3) and/or (a4) and/or (a5) and/or (a6) and/or the ethylenically unsaturated monomer or oligomer (d), the phosphorous containing compound (b) and the amine (c), thus building up the binder of the powder composition of the present invention. To the binder thus obtained optionally the photo-initiator, optionally the various additional substances conventionally used for the manufacturing of powder paints and varnishes and optionally the coating-property-modifying substances are mixed as described above.

Instead of the above methods, it is also possible to dissolve/suspend the different unsaturated constituents of the binder system of the present invention, optionally the photo-initiator, and the various additional substances in a solvent such as dichloromethane, to grind in order to obtain a homogeneous suspension containing approximately 30% by weight of solid matter and subsequently to evaporate the solvent, for example by spray drying at a temperature of approximately 50° C., according to methods known per se.

The powder paints and varnishes thus obtained, are entirely suitable for application to the article to be coated by conventional techniques, that is to say by the well-known technique of e.g. deposition in a fluidised bed or by application with a triboelectric or electrostatic spray gun.

After having been applied to the article concerned, the coatings deposited are heated e.g. in a forced circulation oven or by means of infrared lamps at a temperature of 80 to 200° C. for a time of e.g. approximately 0.5 to 10 minutes for the purpose of obtaining the melting and the spreading of the powder particles as a smooth, uniform and continuous coating at the surface of the said article. The molten coating is then cured by radiation, such as UV light emitted, for example, by medium pressure mercury vapour UV radiators, of preferably at least 80 to 250 W/linear cm, or by any other well-known source of the state of the art, at a distance of e.g. approximately 5 to 20 cm and for a time sufficient to cure the coating, such as 1 to 60 seconds. The molten coating can also be cured with accelerated electron beams of preferably at least 150 keV, the power of the devices employed being a direct function of the thickness of the composition layer to be cured by polymerisation.

The invention is also concerned by articles partially or entirely coated by the coating processes.

The radiation curable powder compositions in accordance with the invention though they can be applied to the most diverse substrates, such as, for example, paper, cardboard, wood, fibre board, textiles, plastics, such as polycarbonates, poly(meth)acrylates, polyolefins, polystyrenes, poly(vinyl-chloride)s, polyesters, polyurethanes, polyamides, copolymers such as acrylonitrile-butadiene-styrene (ABS) or cellulose acetate butyrate, and the like, and more particularly are designed for their application on metal substrates of different nature such as e.g. copper, aluminium, steel, etc. even without van extensive metal surface preparation.

The examples which will follow, illustrate the invention without limiting it. Except when otherwise indicated, the parts mentioned throughout the description and in the examples are parts by weight.

EXAMPLE 1

Step 1

A mixture of 369.7 parts of neopentyl glycol, 10.2 parts of trimethylolpropane along with 2.1 parts of n-butyltin trioctoate catalyst is placed in a conventional four-neck round bottom flask.

The flask contents are heated while stirring, under nitrogen to a temperature of circa 140° C. Thereupon 528.7 parts of terephthalic acid along with 27.8 parts of adipic acid are added while stirring and the mixture is gradually heated to a temperature of 230° C. Distillation starts from about 190° C. After about 95% of the theoretical quantity of water is distilled and a transparent prepolymer is obtained, the mixture is cooled down to 200° C.

The hydroxyl functionalised prepolymer thus obtained, is characterised by:

| | |
|---|---|
| AN = | 10 mg KOH/g |
| OHN = | 51 mg KOH/g |

Step 2

To the first step prepolymer standing at 200° C., 96.5 parts of isophthalic acid are added. Thereupon the mixture is gradually heated to 225° C. After a two-hour period at 225° C. and when the reaction mixture is transparent, 0.8 parts of tributylphosphite are added and a vacuum of 50 mm Hg is gradually applied.

After 3 hours at 225° C. and 50 mm Hg, following characteristics are obtained:

| | |
|---|---|
| AN = | 37 mg KOH/g |
| OHN = | 2 mg KOH/g |
| $Brfld^{200°\ C.}$ = | 5400 mPa·s |

Step 3

The carboxyl functionalised polyester is cooled down to 150° C. and 0.9 parts of di-t-butylhydroquinone along with 4.6 parts of ethyltriphenylphosphonium bromide are added. Subsequently 77.3 parts of glycidylmethacrylate is slowly added (30 minutes) while stirring under oxygen. An hour after the addition is ended, a methacryloyl unsaturated polyester with the following characteristics is obtained

| | |
|---|---|
| AN = | 5 mg KOH/g |
| OHN = | 39 mg KOH/g |
| unsaturation = | 1.5 meq/g |
| $Brfld^{200°\ C.}$ = | 3800 mPa·s |

-continued

| | |
|---|---|
| $Tg^{quenched}$ (DSC, 20°/min) = | 56° C. |
| Mn (GPC) = | 4000 |

EXAMPLE 2

A mixture of 152.2 parts of ethylene glycol and 727.1 parts of dodecanoic acid along with 2.0 parts of n-butyltin trioctoate catalyst is put in reaction according to the procedure of example 1.

The flask contents are heated, while stirring, under nitrogen to a temperature of circa 140° C. at which point water is distilled from the reactor. The heating is continued to a temperature of 220° C. When distillation under atmospheric pressure stops, 0.8 parts of tributylphosphite is added and a vacuum of 50 mm Hg is gradually applied.

After 3 hours at 220° C. and 50 mm Hg, following characteristics are obtained:

| | |
|---|---|
| AN = | 52 mg KOH/g |
| OHN = | 2 mg KOH/g |

Subsequently the carboxyl functionalised polyester is cooled down and the methacrylation is carried out accordingly the procedure of Example 1. When the polyester stands at 140° C., 1.2 parts of di-t-butylhydroquinone and 3.9 parts of benzyltriphenylphosphoniumchloride is added along with a slow alimentation of 201.1 parts of glycidylmethacrylate. The mixture is stirred for 1 hour at 140° C. under oxygen until following characteristics are obtained:

| | |
|---|---|
| AN = | 2 mg KOH/g |
| OHN = | 48 mg KOH/g |
| unsaturation = | 0.8 meq/g |
| $Brfld^{200° C.}$ = | 150 mPa·s |
| $Tm^{quenched}$ (DSC, 20°/min) = | 65° C. |
| Mn (GPC) = | 2530 |

EXAMPLE 3

In a conventional four-neck round bottom flask equipped with a stirrer, an inlet for oxygen, an inlet for (meth)acrylic acid and a thermocouple attached to a thermoregulator, 910 parts of Araldite GT7004, a Bisphenol A-type epoxy resin, are heated under oxygen to a temperature of 140° C. Subsequently 0.8 parts of ethyltriphenylphosphonium bromide are added and the addition of 90 parts of acrylic acid containing 0.2 parts of di-t-butylhydroquinone, is started. The acrylic acid addition is completed in a 3 hour period. One and an half hour after the completion of the acrylic acid addition, a resin with the following characteristics is obtained:

| | |
|---|---|
| AN = | 7 mg KOH/g |
| unsaturation = | 1.24 meq/g |
| $Brfld^{200° C.}$ = | 700 mPa·s |
| $Tg^{quenched}$ (DSC, 20°/min) = | 49° C. |
| Mn (GPC) = | 1650 |

EXAMPLE 4

A quantity of 360.89 parts of butyl acetate is placed in a conventional four-neck glass reactor equipped with a stirrer, two addition funnels and a thermocouple attached to a thermoregulator and heated to 92° C. Subsequently a mixture of 90.22 parts of butyl acetate and 5.70 parts of 2,2'-azobis(2-methylbutanenitrile) are added over a 215 minute period. Five minutes after the start of this addition a second addition consisting of a mixture of 128.25 parts of glycidyl methacrylate, 322.79 parts of styrene and 22.55 parts of dodecylmercaptan is added to the reactor over a 180 minute period.

When the additions are finished, the reaction is continued for 100 minutes. Subsequently a vacuum is applied in order to evaporate the solvent used. An acrylic copolymer with the following characteristics is obtained:

| | |
|---|---|
| Tg = | 76° C. |
| E.E.W. (epoxy equivalent weight) = | 530 g/equivalent |
| Mn = | 2685 |
| Mw = | 5650 |

The thus obtained acrylic copolymer then is heated to a temperature of 125° C. An air flow is set up through the reaction vessel.

To the reactor 2.25 parts of Norsocryl 200 is added, and 15 minutes later 2.25 parts of tert.butyl phosphonium acetate is added. Subsequently 65.01 parts of acrylic acid are added over a thirty minute period.

After a reaction period of 200 minutes an acrylic copolymer with the following characteristics is obtained:

| | |
|---|---|
| AN = | 4.5 mg KOH/g |
| $Brookfield^{150° C.}$ = | 35000 mPa·s |
| Residual solvent = | 0.2% weight |
| Tg = | 70° C. |
| U.E.W. = | 1.49 meq/g |
| Mn = | 3145 |
| Mw = | 9660 |

EXAMPLE 5

In a conventional double walled flask, equipped with a stirrer, an inlet for oxygen, an inlet for hydroxyethylmethacrylate and a thermocouple attached to a thermoregulator, 450 parts of toluene and 0.6 parts of hydroquinone are loaded. Thereupon 162.3 parts of phosphorpentoxide are added in 5 minutes while stirring. Thereupon 445.7 parts of hydroxyethylmethacrylate together with 0.6 parts of hydroquinone are slowly added over a period of 30 minutes; meanwhile the mixture is refrigerated in order to keep the temperature below 70° C. One hour after the completion of the hydroxyethylmethacrylate addition the flask content is cooled down and the ethylenically unsaturated phosphorous containing compound is isolated using a rotary evaporator.

EXAMPLE 6

392.16 parts of n-butylacetate are transferred in a double jacket flask of 5 l equipped with a stirrer, a water cooled condenser and an inlet for nitrogen and a thermoprobe attached to a thermoregulator.

The flask content is heated and stirred continuously while nitrogen is purged through the solvent. At a temperature of 92° C. a mixture of 98.04 parts of n-butylacetate with 19.61 parts of 2,2' azobis (2-methylbutanenitrile) is fed in the flask during 215 minutes with a peristaltic pump. 5 minutes after the start of this feed, a second one is started with another pump and is a mixture of:

169.50 parts of 2-(diethylamino)ethyl methacrylate
320.69 parts of isobornylacrylate This feed takes 180 minutes.

After 315 minutes of total synthesis time, the flask content is emptied. A sample is taken for gas chromatography analysis of the unreacted monomer content.

The analysis results shows a residual unreacted monomer content of 0.31 mass % isobornyl acrylate and 0.01% 2-(diethylamino)ethyl methacrylate.

The solvent (butyl acetate) of the obtained polymer solution is evaporated in a rotary evaporator at 160° C. during 120 minutes at a reduced air pressure of 7 to 10 hPa.

The polymer is characterised by:
Glass transition temperature (DSC (quenched)): 42° C.
Mn (GPC): 1110
$Brfld^{175° C.}$: 2470 mPa·s

EXAMPLE 7

Preparation of Radiation Curable Powder Coating Compositions

A series of black powders, which can be used for the manufacturing of coatings by spraying with the aid of an electrostatic spray gun, is prepared from a binder comprising the polyesters of Example 1 and/or 2 optionally in combination with the epoxy resin containing (meth)acryloyl groups of Example 3 or the acrylic copolymer of Example 4, the ethylenically unsaturated phosphorous compound as prepared in Example 5 and different amino-compounds, in accordance with the present invention, and by way of comparison from compositions only containing the ethylenically unsaturated phosphorous compound without the amino compound, or neither containing the ethylenically unsaturated phosphorous compound nor the amino compound, the formulation of these powders being as follows:

| | |
|---|---|
| binder | 980 parts |
| Microlin Black (Ciba) | 20 parts |
| α-hydroxyketone (Irgacure 2959 (Ciba)) | 8 parts |
| bisacylphosphineoxide (Irgacure 819 (Ciba)) | 32 parts |
| fluidity regulating agent (Resiflow PV5 (Worlee Chemie)) | 10 parts |

These powder compositions are prepared by dry mixing the ethylenically unsaturated resins, the phosphorous containing compound and the amino compound, when present, the photo-initiator with the various additional substances conventionally used for the manufacture of powder paints. The mixture obtained is homogenised at a temperature of approximately 70 to 140° C. in a Prism 16 mm (L/D=15/1) twin screw extruder (from the company Prism), and the extrudate is ground in a grinder of Alpine 100UPZ (from the company Alpine). To complete, the powder is sieved in order to obtain a size of the particles between 10 and 110 µm.

EXAMPLE 8

Characteristics of the Coating

The powders formulated as described in example 7 with the binder composition in accordance with the present invention and with the binder systems given by way of comparison, are applied with an electrostatic spray gun at a voltage of 60 kV on zinc phosphated steel panels at a coating thickness between 80 and 90 µm.

The coatings deposited are then subjected to melting in a medium infrared/convection oven (Triab) at a temperature of 140° C. during a time of approximately 3 minutes, and are then subjected to irradiation with ultraviolet light emitted by a 160 W/cm Gallium-doped followed by a 160 W/cm medium pressure mercury vapour UV-bulb (Fusion UV Systems Ltd.) with a total UV dose of 4000 mJ/cm$^2$.

The cured coatings thus obtained are subjected to conventional tests. The results obtained are reported in Table 1 which shows in:

column 1: the number of the example of the formulation column 2: the number of the preparation example of the ethylenically unsaturated resin and its weight percentage in the complete binder column 3: weight percentage of the phosphorous containing compound of Example 5 in the complete binder column 4: the nature and weight percentage of the amino compound in the complete binder column 5: the value of resistance to direct impact (DI) and reverse impact (RI) in kg.cm, according to ASTM D2795 on zinc phosphated steel column 6: classification value for the cross-cut adhesion on zinc phosphated steel by tape test according to ASTM D3359 according to which 5B: the edges of the cuts are completely smooth; none of the squares of the lattice is detached 4B: small flakes of the coating are detached at intersections; less than 5% of the area is affected 3B: small flakes of the coating are detached along edges and at intersections of cuts; the area affected is 5 to 15% of the lattice 2B: the coating has flaked along the edges and on parts of the squares; the area affected is 15 to 35% of the lattice 1B: the coating has flaked along the edges of cuts in large ribbons and whole squares have detached; the area affected is 35 to 65% of the lattice 0B: flaking and detachment worse than grade 1

The evaluation of the cross-cut adhesion test is performed on zinc phosphated steel as a function of time where ageing of the resin, the powder and the cured coating respectively is evaluated after well-defined periods of time which are more particularly:

for the resin: 4 weeks of ageing for the powder: 5 weeks of ageing for the cured coating: 1 hour ageing and subsequently 4, 8, 12 and 16 weeks of ageing

TABLE 1

| Formulation | % weight ethylenically unsaturated resin on binder | % weight phosphorous compound (Ex. 5) on binder | % weight amino compound on binder | DI/RI kg · cm | Cross-cut |
|---|---|---|---|---|---|
| Ex. 9 | Ex. 1-97.9 | 2 | tBA 0.10 | 140/140 | 5B |
| Ex. 10 | Ex. 1-57.5 Ex. 3-38.4 | 4 | tMeHMDA 0.10 | 120/120 | 5B |
| Ex. 11 | Ex. 1-87.7 Ex. 2-10.0 | 2 | Ex. 6 0.30 | 160/140 | 5B |
| Ex. 12 | Ex. 1-73.7 Ex. 2-5.0 Ex. 3-19.2 | 2 | tMeHMDA 0.08 | 140/120 | 5B |
| Ex. 13R | Ex. 1-98.0 | 2 | 0 | 140/140 | 5B |
| Ex. 14R | Ex. 1-100.0 | 0 | 0 | 140/120 | 2B |
| Ex. 15R | Ex. 1-57.5 Ex. 3-38.5 | 4 | 0 | 120/100 | 5B |
| Ex. 16R | Ex. 1-88.0 Ex. 2-10.0 | 2 | 0 | 140/140 | 5B |
| Ex. 17 | Ex. 1-60.9 Ex. 2-10.0 Ex. 4-25.0 | 4 | tMeHMDA 0.10 | 100/80 | 5B | tBA: tri-n-butylamine
tMeHMDA: N,N,N',N'-tetramethyl-1,6-hexanediamine
Ex. 6=amino compound as prepared in Example 6

The cross cut adhesion test results are reproduced in Table 2 and Table 3 below for the coatings of example 9, example 10 and example 11, accordingly the invention and of example 13R, 15R and example 16R, given as comparative examples respectively.

In these tables:
Column 1: represents the ageing period in weeks
Column 2: represents the cross cut adhesion value of the coating upon ageing of the binder
Column 3: represents the cross cut adhesion value of the coating upon ageing of the powder
Column 4: represents the cross cut adhesion value of the coating upon ageing of the coating

TABLE 2

| | Resin | | | Powder | | | Coating | | |
|---|---|---|---|---|---|---|---|---|---|
| Ageing | Ex 9 | Ex 10 | Ex 11 | Ex 9 | Ex 10 | Ex 11 | Ex 9 | Ex 10 | Ex 11 |
| 0 | 5B | 5B | 5B | 5B | 5B | 5B | 5B | 5B | 5B |
| 4 | 5B | 5B | 5B | | | | 5B | 5B | 5B |
| 5 | | | | 5B | 5B | 5B | | | |
| 8 | | | | | | | 5B | 5B | 5B |
| 12 | | | | | | | 5B | 5B | 5B |
| 16 | | | | | | | 5B | 5B | 5B |

TABLE 3

| | Resin | | | Powder | | | Coating | | |
|---|---|---|---|---|---|---|---|---|---|
| Ageing | Ex 13R | Ex 15R | Ex 16R | Ex 13R | Ex 15R | Ex 16R | Ex 13R | Ex 15R | Ex 16R |
| 0 | 5B | 5B | 5B | 5B | 5B | 5B | 5B | 5B | 5B |
| 4 | 2B | 1B | 2B | | | | 4B | 5B | 4B |
| 5 | | | | 1B | 1B | 1B | | | |
| 8 | | | | | | | 2B | 2B | 1B |
| 12 | | | | | | | 1B | 1B | 1B |
| 16 | | | | | | | 1B | 0B | 1B |

From the tables above it clearly appears that for the coatings obtained from the powders accordingly the present invention (ex 9, 10, 11) and thus comprising the phosphorous and amine compound, there is an outstanding adhesion to metal which persist upon ageing of the binder and/or the powder and/or the coating contrary to these coatings obtained from powders derived from a binder not comprising the amine compound (Ex. 13R, 15R and 16R) where the initial good adhesion fades away upon ageing of either the resin, or the powder or the coating.

The invention claimed is:

1. A radiation curable powder composition which comprises, per 100 parts by weight of (a), (b) and (c),
   (a) 70 to 99.4 parts by weight of at least one ethylenically unsaturated resin,
   (b) 0.5 to 20 parts by weight of at least one phosphorous containing compound, and
   (c) 0.1 to 10 parts by weight of at least one amine,
   wherein the phosphorous containing compound (b) is an organic derivative of phosphinic acid, phosphonic acid or phosphoric acid, and
   wherein said organic derivative has at least one organic moiety having at least one functional group.

2. The radiation curable powder composition according to claim 1,
   wherein the amine (c) is an organic compound comprising at least one group of formula

wherein each R' independently represents hydrogen, alkyl, alkenyl, aryl, heterocycle or a combination thereof, each optionally substituted by one or more hydroxyl and/or amino derivatives, and optionally containing 1 to 3 ether bridges, 1 to 3 amino bridges, 1 to 3 —CO—bridges, and/or 1 to 3 —COO—bridges; wherein two R' moieties may be linked together in order to form a ring.

3. The radiation curable powder composition according to claim 2,
   wherein the amine (c) is selected from the group consisting of a compound of formula (I), a compound of formula (II), a compound of formula (III) a compound of formula (IV), a polymer containing one or more groups of formula (V), and a mixture thereof,

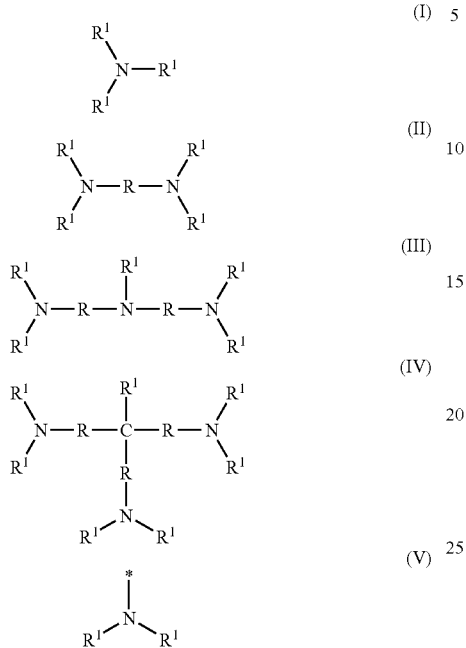

wherein
each $R^1$ is independently chosen from hydrogen, alkyl, alkenyl, aryl, heterocycle or combinations thereof, each optionally substituted by one or more hydroxyl, and optionally containing 1 to 3 ether bridges, 1 to 3 —CO— bridges, and/or 1 to 3 —COO— bridges; wherein two $R^1$ moieties may be linked together in order to form a ring;
each R independently represents an alkylene, alkenylene, arylene or aralkylene chain which may contain from 1 to 3 ether bridges, 1 to 3 —CO— bridges and/or 1 to 3 —COO— bridges and which is optionally substituted by one or more hydroxyl.

4. The radiation curable powder composition according to claim 3,
wherein the amine (c) is selected from the group consisting of propylamine, butylamine, sec-butylamine, tert-butylamine, pentylamine, hexylamine, 2-ethylhexylamine, cyclohexylamine, octylamine, aniline, ethylenediam me, 1,2-diaminopropane, 1,3-diaminopropane, 2,2-dimethyl-1,3-propanediamine, 1,4-butanediamine, 1,5-pentanediamine, 1,6-exanediamine, 1,2-cyclohexanediamine, 1,3-cyclohexanediamine, 1,4-cyclohexanediamine, 3-(methylamino)propylamine, 3-(dimethylamino)propylamine, 3-(dimethylamino)propylamine, isophoronediamine, 4, 4'-diaminodicyclohexylmethane 3,3 '-dimethyl-4,4'-diamino-dicyclohexylmethane, 4,4'-diaminodiphenylmethane, 3,3'-dimethyl-4,4'-diaminodiphenylmethane, 3-(diethylamino)propylamine, 3-methoxypropylamine, N-ethyl-1,2-dimethylpro-pylamine, iminobispropylamine, 3,3 '-iminobis(N,N'-dimethyipropylamine), diethylamine, dipropylamine, dibutylamine, dihexylamine, di-(2-ethylhexyl)amine, triethylamine, tn-n-butylamine, tributylamine, trihexylamine, tni-(2-ethylhexyl)amine, tridecylamine, 3-amino-1-propanol, aminoethoxyethanol, aminoethanol, N,N-bis(3-aminopropyl)methylamine, 2-(diethylamino)ethylamine, diethylenetriamine, 2-methoxyethylamine, methylenedianiline, 4,7,10-trioxatridecane-1,1 3-diamine, N—(2-aminoethyl)- 1,2-ethanediamine, di(2-methoxyethyl) amine, N,N'-bis (3-aminopropyl)ethylenediamine, N-(2-aminoethyl)- 1,3-propylenediamine, N,N-diethylethanolamine, N,N-dimethylaminodiglycol, N,N-dimethylbutylamine, N,N-dimethylcyclohexylamine, N,N-dimethylethanolamine, dimethylethylamine, ditridecylamine, N-ethylcyclohexylamine, N-methylcyclohexylamine, methyldiethanolamine, N-mono-methylethanolamine, N,N,N',N'',N''-pentamethyldiethylenetriam me, N,N,N',N'-tetramethyl- 1,6-hexanediamine, N,N,N',N'-tetraethyl- 1,6-hexanediamine, 1,8-diazabicyclo-5,4,0-undec-7-ene, 1,4-diazabicyclo-2,2,2-octane, 1,3,5 -tnis(dimethylaminopropyl)-hexahydrotriazine, 1,4-dimethylpiperazine, N,N '-dimethylpiperazine, 2,2,2 -dimorpholinodiethylether, morpholine, N-methylmorpholine, N-ethylmorpholine, cis-2,6-dimethylmorpholine, piperazine, N-methylpiperazine, N-ethylpiperazine, N-methylpiperidine, N-ethylpiperidine, hydroxyethylpiperidine, imidazole, 2,4,6-triamino-1,3, 5-triazine optionally substituted by one or more of hydroxymethyl, methoxymethyl and/or butoxymethyl, andamine containing acrylic copolymer incorporating at least one of 2-(tert-butylamino)ethyl methacrylate and 2-(diethyl-amino)ethyl methacrylate.

5. The radiation curable powder composition according to claim 4,
wherein the amine is N,N,N',N'-tetramethyl- 1,6-hexanediamine.

6. The radiation curable powder composition according to claim 1,
wherein the phosphorous containing compound (b) corresponds to formula (VI):

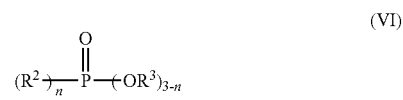

wherein
each $R^2$ independently represents alkyl, aryl or alkenyl, each optionally containing 1 to 3 ether bridges, 1 to 3 —CO— bridges, and/or 1 to 3 —COO— bridges, and each optionally substituted by 1 to 10 halogen, hydroxyl and/or amino derivatives,
each $R^3$ is independently hydrogen or $R^4$, wherein $R^4$ is as defined for $R^2$; and
n is 0 to 3.

7. The radiation curable powder composition according to claim 6,
wherein the phosphorous containing compound (b) corresponds to formula VII:

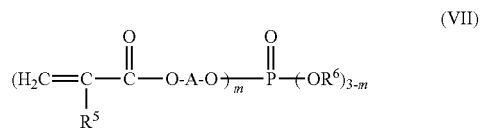

wherein
each $R^5$ is independently hydrogen or an alkyl group having from 1 to 8 carbon atoms;

each $R^6$ is independently selected from the group consisting of hydrogen, an alkyl group having from 1 to 8 carbon atoms, and a haloalkyl group having from 1 to 8 carbon atoms;

each A is independently an alkylene group containing from 1 to 9 carbon atoms, optionally containing 1 to 3 ether bridges; and m is 1 to 3.

8. The radiation curable powder composition according to claim 7,
wherein $R^5$ is hydrogen or methyl, $R^6$ is hydrogen, A is an ethylene group, and m is 1, 2 or 3.

9. The radiation curable powder composition according to claim 1,
wherein the ethylenically unsaturated resin (a) is selected from the group consisting of
(a1) ethylenically unsaturated group containing polyesters,
(a2) ethylenically unsaturated group containing acrylic copolymers,
(a3) ethylenically unsaturated group containing polyphenoxy resins,
(a4) ethylenically unsaturated group containing non-aromatic epoxy resins,
(a5) ethylenically unsaturated group containing polyurethanes,
(a6) ethylenically unsaturated group containing polyesteramides,
and mixtures thereof.

10. The radiation curable powder composition according to claim 9,
wherein the ethylenically unsaturated group containing polyester (a1) is obtained from:
the reaction of a diisocyanate with an hydroxyalkyl(meth)acrylate and a hydroxyl group containing polyester, or
the reaction of a compound having an ethylenically unsaturated group and an epoxy functional group with a polyester containing carboxyl groups.

11. The radiation curable powder composition according to claim 9, wherein the ethylenically unsaturated polyester (a1) has
a number average molecular weight ranging from 1,100 - 16,000, and
a degree of unsaturation from 0.17 to 4.00 milliequivalents of double bonds per gram of polyester.

12. The radiation curable powder composition according to claim 9, comprising at least one ethylenically unsaturated group containing polyester (a1) which is amorphous, or a mixture of at least one ethylenically unsaturated group containing polyester (a1) which is amorphous with at least one ethylenically unsaturated group containing polyester (a1) which is semi-crystalline.

13. The radiation curable powder composition according to claim 9,
wherein the ethylenically unsaturated group containing acrylic copolymers (a2) are obtained from the reaction of:
an acrylic copolymer obtained from 40 to 95 mole percentage of at least one monomer having acrylic or methacrylic groups, 0 to 60 mole percentage of another ethylenically unsaturated monomer, and 5 to 60 mole percentage of an ethylenically unsaturated monomer having functional groups selected from the group consisting of epoxy, carboxyl, hydroxyl and isocyanate, with
a compound having an ethylenically unsaturated group and a functional group capable of reacting with carboxyl, epoxy, isocyanate or hydroxyl, and wherein said acrylic copolymers (a2) have:
a number average molecular weight ranging from 1,000 to 20,000,
a degree of unsaturation from 0.35 to 3.50 milliequivalents of double bonds per gram of acrylic copolymer,
a melt viscosity (cone/plate at 200° C.) of less than 50,000 mPa.s, and
a glass transition temperature ranging from 45 to 100° C.

14. The radiation curable powder composition according to claim 9,
wherein the ethylenically unsaturated group containing polyphenoxy resin (a3) is the reaction product of (meth)acrylic acid with a glycidyl group containing polyphenoxy resin, and wherein said polyphenoxy resin (a3) has:
a number average molecular weight ranging from 500 to 5,000,
a glass transition temperature ranging from 30 to 80° C.,
a degree of unsaturation ranging from 0.2 to 6.0 milliequivalents of double bonds per gram of polyphenoxy resin, and
a melt viscosity (cone/plate at 200° C.) of less than 25,000 mPa.s.

15. The radiation curable powder composition according to claim 9, comprising at least one ethylenically unsaturated group containing polyester (a1), or a mixture of least one ethylenically unsaturated group containing polyester (a1) with at least one ethylenically unsaturated group containing polyphenoxy resin (a3) and/or at least one ethylenically unsaturated group containing acrylic copolymer (a2).

16. The radiation curable powder composition according to claim 1, which comprises, per 100 parts of the total weight of(a), (b), (c) and (d),
from 0 to 20 parts by weight of an ethylenically unsaturated monomer or oligomer (d),
from 0 to 15 parts by weight of photo-initiators,
from 0 to 10 parts by weight of additives selected from the group consisting of UV light absorbers, light stabilizers, fluidity-regulating agents, degassing agents and coating properties modifying substances, and/or
from 0 to 40 parts by weight of pigments and/or fillers.

17. A powder varnish or powder paint comprising the radiation curable powder composition according to claim 1.

18. A process for coating an article, wherein the radiation curable powder composition according to claim 1 is deposited on the article, followed by melting the thus obtained coating and radiation curing the coating in the molten state.

19. An article that is partially or entirely coated by the process of claim 18.

20. The curable powder composition according to claim 1, wherein said organic derivative of phosphinic acid, phosphonic acid or phosphoric acid (b) is unsaturated.

21. The curable powder composition according to claim 20, wherein said unsaturated derivative (b) has at least one unit of olefinic unsaturation.

22. The curable powder composition according to claim 21, wherein said at least one unit of olefinic unsaturation in the phosphorous containing compound (b) is terminally located.

23. The curable powder composition according to claim 9, wherein the ethylenically unsaturated resin (a) is an ethylenically unsaturated group containing polyester (a1).

24. The curable powder composition according to claim 23, wherein the ethylenically unsaturated resin (a) comprises at least one further ethylenically unsaturated resin selected from the group consisting of ethylenically unsaturated group containing acrylic copolymers (a2), ethylenically unsaturated group containing polyphenoxy resins (a3) and ethylenically unsaturated group containing non-aromatic epoxy resins (a4).

* * * * *